Patented Aug. 1, 1933

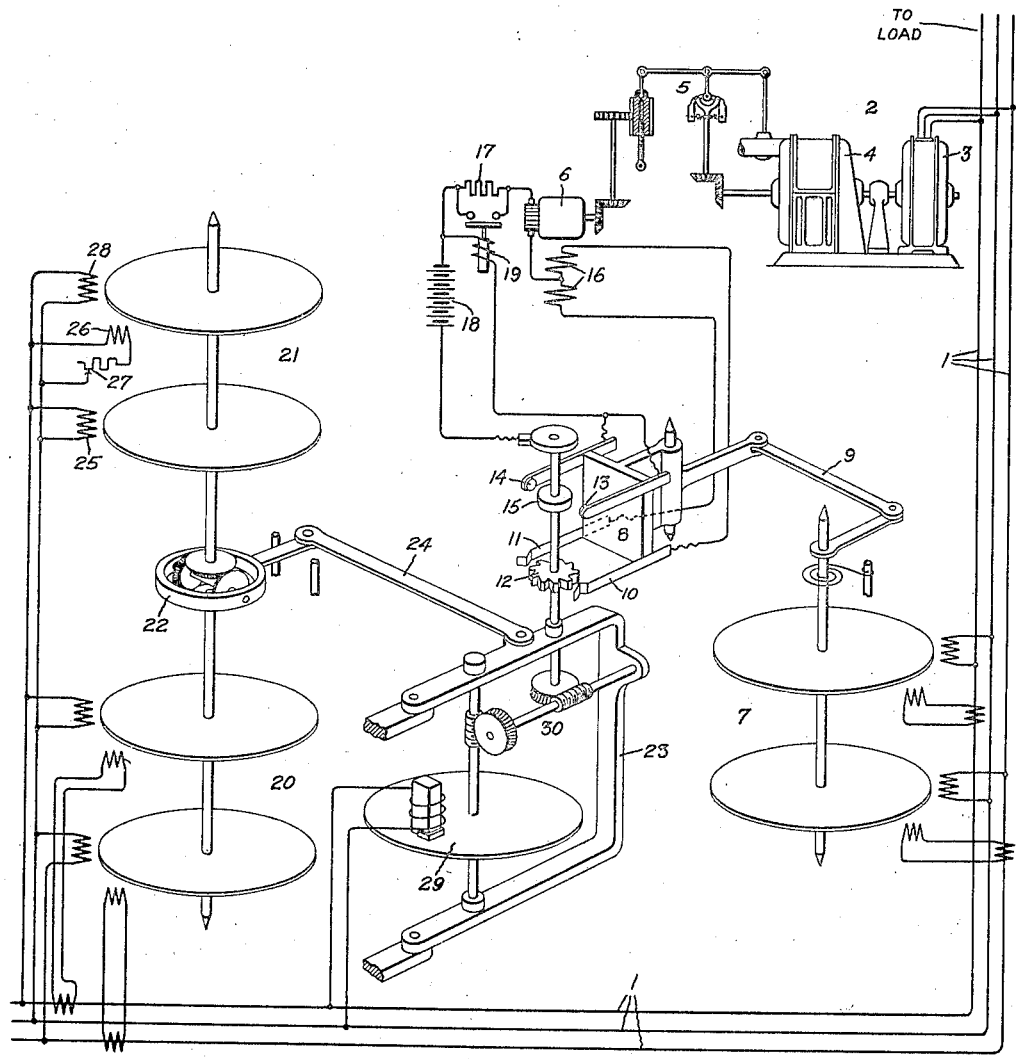

1,920,783

UNITED STATES PATENT OFFICE 1,920,783

ELECTRICAL REGULATOR

Alan G. Darling, Schenectady, N. Y., assignor to General Electric Company, a Corporation of New York Application December 31, 1931. Serial No. 584,072

20 Claims. (Cl. 171—119)

My invention relates to electrical regulators, and more particularly to apparatus which not only regulates the instantaneous value of a condition to be regulated, but which also regulates an integrated function of the regulated condition.

It is often desirable, and sometimes necessary, not only to maintain a regulated condition, or quantity, at a substantially constant value, but also to make sure that the unavoidable momentary over and under, or plus and minus, deviations of the regulated quantity from its normal value are equalized. For example, it is now customary in alternating current power systems to regulate the frequency of the alternating current in such a manner that not only is the instantaneous value of the frequency regulated to a substantially constant value, usually sixty cycles, but also the integrated value of the frequency, with respect to time, is regulated, so that over a given period of time such as a day, or a month, or a year, the total number of cycles of the system will have been at an exact average of sixty cycles per second. One reason for such precise regulation of frequency is that it is the frequency of systems which serves to give electric clocks, of the synchronous motor variety, their accurate time keeping characteristics.

Another example of a situation where it is desirable to regulate both the instantaneous value of a quantity and its average, or integrated value, is in cases where electrical energy is purchased from a central generating station, or public utility company. Such energy, when purchased in relatively large amounts for industrial, or commercial, purposes, is paid for at rates which are fixed by contract. Such contracts usually include demand charge clauses which subject the customer to an increased rate if the amount of energy which he uses in any given time, usually fifteen minutes, exceeds a previously agreed upon maximum demand. Under these circumstances, and assuming that the maximum demand which is specified in the contract is approximately correct for the customer's needs, it is to his advantage to use energy at a substantially uniform average rate which is just about equal to the specified maximum demand because he will then be paying for his energy at the lowest rate.

Regulators which respond to the instantaneous value of a condition to be regulated and which act automatically to maintain the instantaneous value of this condition substantially constant, are well known in the art, but due to the fact that changes in the regulated quantity take place at varying rates in opposite directions, and that the speed of operation of such regulators is not always the same in each direction, or under different operating conditions, an accumulative error is inevitable so that, for example, in the case of the regulation of electrical load in watts, the total integrated value of the energy in watt-hours over a given period of time when divided by this time in hours will not be equal to the load in watts which it is desired to maintain substantially constant.

Integrating type regulators for regulating the integrated value of a condition to be maintained substantially constant are also known in the art, especially in connection with frequency regulating systems, but due to their necessary complexity and delicacy, they are not well adapted to regulate a condition which is subject to disturbing influences of relatively large magnitude and frequent occurrence.

In accordance with my invention, I provide a novel regulator, which for want of a better name may be termed an indicating-integrating regulator. This regulator is provided with preferably relatively quick acting means for regulating the instantaneous value of a condition to be regulated, and with additional relatively slow acting means for storing up accumulated errors in the integrated value of the regulated condition, and for causing said errors to be cancelled so as to maintain the integrated value of the condition substantially constant.

It is an object of my invention to provide a new and improved electrical regulator.

Another object of my invention is to provide a novel combination regulator for regulating both the instantaneous value and integrated value of a condition to be regulated.

My invention will be better understood from the following description taken in connection with the accompanying drawing and its scope will be pointed out in the appended claims.

Referring now to the single figure of the accompanying drawing, wherein I have illustrated schematically an embodiment of my invention employed as an automatic load regulator for maintaining the power flow through a power supply circuit 1 substantially constant. Circuit 1, which is illustrated by way of example as a three-phase alternating current circuit, may be connected at its lower left hand end to a suitable source of power supply (not shown), such as a central generating station from which power is purchased by a consumer, while its upper right hand end is connected to a variable consumer load. My invention is capable of use in connection with a number of alternative arrangements for regulating for constant loads, such for example, as arrangements for regulating the value of the load itself, either by changing the value of the load as a unit, or by connecting and disconnecting incremental loads from the circuit so as to maintain the effective load substantially constant; or by means of an auxiliary source or sources connected in parallel to the main load circuit and so regulated as to supply the marginal load required by the main load when intending to increase the value of load for which circuit 1 is to be regulated. I have illustrated the latter arrangement in which a turbo-alternator set 2 having an alternating current generator 3 is connected to circuit 1 and a suitable steam turbine 4 is provided for driving the generator 3. Turbine 4 has a governor mechanism 5 whose calibration is arranged to be modified in any well known way by means of a pilot motor 6 associated with my regulating arrangement. In this manner, by controlling motor 6 the power output of turbine 4 and consequently the power output of generator 3 may be varied so that with variations in load, the load on circuit 1 remains constant while the marginal fluctuations in load are carried by the turbo-alternator set 2.

In cases where it is necessary or desirable to employ a plurality of parallel connected auxiliary sources in order to carry the marginal fluctuating load, it will occur to those skilled in the art that it will be desirable to provide load division control means for insuring that the parallel connected auxiliary generators divide the marginal load in a proper manner. Such load division regulators have been used in connection with automatic frequency control systems where one of a plurality of parallel connected alternating current generators is a master generator for regulating frequency which is provided with control means for causing the other generators to follow the master generator and assume some of the additional load which would ordinarily be required to be assumed by the master generator and which in many cases would overload the master generator. It will also occur to those skilled in the art that in case the pilot motor 6 is separated by a considerable distance from the auxiliary turbo-alternator set that it will be convenient to provide suitable motion transmitting means between the governors of this unit and the pilot generator. Many different varieties of such means are known in the art and any of them may be employed in connection with my invention if desired.

The elements of my invention which are arranged to respond to the instantaneous value of power flow in circuit 1 and which act to maintain this value substantially constant comprise a power responsive device 7 connected to circuit 1. This device may be of any suitable type and is illustrated as the torque element of an induction disc type three-phase wattmeter. A pivotally mounted contact carrying assembly 8 is arranged to be controlled by element 7 through a suitable motion transmitting linkage 9. Contact assembly 8 carries a pair of resiliently mounted contacts 10 and 11 which are arranged to engage a contact 12 respectively, when the assembly 8 is moved in opposite directions. Contact 12 may be of any type but it is preferably a rotatable toothed wheel, as shown, for reasons which will be pointed out hereinafter. Contact assembly 8 also carries a pair of contacts 13 and 14 which are arranged to engage respectively a contact member 15 depending upon the direction of movement of the assembly 8. Contacts 10 and 11, when they engage contact 12, control respectively the direction of rotation of pilot motor 6 and are connected in a series circuit through one or the other of its reversing field winding 16, resistance element 17 and a suitable source of current supply, such as a battery 18. Contacts 13 and 14 when they engage contact 15 control the energization of a relay 19 which is connected in circuit with the battery 18. When relay 19 is energized by the engagement of either contact 13 or 14 with contact 15 it short circuits the resistance 17 thereby increasing the speed of operation of the pilot motor 6 regardless of its direction of rotation.

The above described arrangement, which acts in response to changes in the instantaneous value of the quantity to be regulated, in this case load, and which acts to maintain this condition substantially constant, so far as its instantaneous value is concerned, is disclosed in a similar form and broadly claimed in a Patent No. 1,848,852, granted March 8, 1932, on an application of Louis W. Thompson, and assigned to the assignee of the present application. The operation of this arrangement in the present application is as follows: Assume that wattmeter 7 is so calibrated that when the power flow in circuit 1 is at the value which it is desired to maintain constant, the contact carrying assembly 8 will be stationary and its contacts will be equally spaced from the contacts 12 and 15 respectively. If now the load on circuit 1 should increase for any reason thereby increasing the power flow through this circuit the watt responsive element 7 will respond and will turn in a clockwise direction as viewed in the drawing, thereby causing engagement of contact 10 with contact 12. This will complete a circuit for the operation of pilot motor 6 which will act to vary the setting of the governor 5 to increase the steam input to turbine 4, and consequently to increase the power output of the generator 3 which will thereby act to assume the marginal increase in load and reduce the total load on circuit 1. If the increase in load is relatively large the torque produced by 7 will be so strong as to flex contact 10 thereby causing engagement between contacts 13 and 15. This will cause relay 19 to short circuit resistance 17, thereby increasing the speed of operation of the motor 6, which will of course tend to increase the speed of action of the regulator as a whole. In a similar manner, if the load should decrease, thereby decreasing the power flow through circuit 1, the wattmeter 7 will so act as to cause contact 11 to engage contact 12, thereby reversing the direction of rotation of the motor 6 and reducing the power output of the turbo-alternator set 2 with the result that the load on circuit 1 will increase. If a large amount of load has been removed from circuit 1 and it is necessary to decrease the load on turbo-alternator set 2 relatively quickly and by a relatively large amount, the contact 11 will be flexed, thereby engaging contacts 14 and 15 which operate relay 19, thereby short circuiting resistance 17 and increasing the speed of operation of the motor 6.

In the above manner changes in the instantaneous value of the power flow in circuit 1 may be made to cause compensating changes in the power output of the turbo-alternator set 2 in such a manner as to tend to maintain the power flow in circuit 1 substantially constant. If the increments and decrements of energy, which are unavoidably added to and subtracted from the energy flow in circuit 1 when regulating operations occur, were equal, either individually or collectively, they would cancel each other and would produce no changes in the average or integrated value of the energy flow. As a practical matter, however, it is impossible to realize such operation with the result that, even though the regulator acts to maintain substantially constant the power flow in circuit 1, there will arise an accumulated error so far as the integrated value of energy flow in the circuit is concerned.

In order to make sure that the amount of energy flowing through circuit 1 for equal increments of time, such for example as the demand period, is the same, I provide an arrangement which responds to the integrated value of the deviation of the load in circuit from the predetermined normal value at which it is to be maintained. In the illustrated embodiment of my invention this means consists of an energy responsive device, such for example as the motor element 20 of an induction type polyphase watt-hour meter, connected in the usual manner to respond to the energy flow in circuit 1, and a relatively constant speed device 21. A differential mechanism 22 is provided and this arrangement responds to a difference in speed between the energy responsive device 20 and the constant speed device 21 in such a manner as to cause contacts 12 and 15 to be moved. As shown, contacts 12 and 15 are mounted on a pivotally mounted frame member 23, which is arranged to be moved by differential mechanism 22 through a suitable motion transmitting linkage 24. In actual practice the watthour meter motor element 20 will be provided with the conventional drag magnet which has been omitted in order to simplify the showing of my invention.

The constant speed device 21 may be any one of a number of well known equivalent devices for producing constant speed rotation. As illustrated, it consists of the motor element of a single phase induction disk type watthour meter which is modified in the following way: The ordinary permanent magnet, drag magnet, of such a motor element is replaced by an alternating current energized magnet 25, which is connected to vary with the voltage of circuit 1. The current winding 26 of the motor element 21 is connected through an adjustable rheostat 27 across one of the phases of the circuit 1, while the potential coil 28 of this motor element is connected across the same phase of the circuit 1. The currents in the windings 26 and 28 of the motor element produce an operating torque in the usual manner and this motor element is rotated at a speed corresponding to the load value of the rheostat 27. In this manner, by adjusting this rheostat the speed of operation of device 21 may be controlled. By making the damping magnet 25 respond to the same voltage as the voltage coil of the motor element, the speed of operation of the arrangement will be independent of variations in the voltage of circuit 1.

If motor elements 20 and 21 are adjusted to operate in relatively opposite directions, and if motor element 21 is adjusted to operate at exactly the same speed of rotation as motor element 20, when the load or power flow in circuit 1 is at the normal value which it is desired to maintain constant, there will be no tendency for the differential mechanism 22 to move the contacts 12 and 15. If now the load on circuit 1 varies, the speed of motor 20 will increase or decrease in accordance with these changes in load and as the device 21 has been turning at a constant speed, the differential mechanism 22 will move the contacts 12 and 15 until the load on circuit 1 is restored to its normal value. As soon as it is restored to its normal value, the differential mechanism 22 will stop moving the contacts 12 and 15, but before these contacts can again be restored to their normal position as much energy must be added or subtracted from the flow through circuit 1 as has been already subtracted or added thereto due to the changes in load. For example, if devices 20 and 21 are arranged to rotate in a clockwise and counter-clockwise direction, respectively, as viewed in the drawing, and if the power flow through circuit 1 increases momentarily, the differential mechanism 22 will be actuated and will move contact 12 toward contact 10. This motion will continue so long as there is a differential speed between devices 20 and 21. Similarly, a decrease in power flow through circuit 1 will cause a reverse movement of differential 22 thereby causing contact 12 to move toward contact 11.

Assuming that contacts 10 and 12 were fixed, it will be clear that this motion of contact 12 in response to the changes in the integrated or average value of the power flow through circuit 1 will in itself produce a regulatory action of this function of the power flow in that as contact 12 moves towards contact 10, they will engage each other thereby causing pilot motor 6 to increase the steam flow through the turbine 4 and thereby increase the power output of the turbo-alternator set to the load, thereby decreasing the load on the circuit 1. Similarly, when contact 12 moves toward contact 11 in response to increases in the integrated error in power flow through circuit 1, these contacts will engage each other, thereby tending to bring the power flow in circuit 1 back to its normal value. Contact 12 will therefore tend to stay in its centered or mid-position between contacts 10 and 11, and obviously so long as this contact stays in this position there can be no accumulated error or difference between the value of power flow in circuit 1 in watts for which wattmeter 7 is set and the total amount of energy in watt-hours which flows through circuit 1 in any predetermined period of time divided by the number of hours in this time.

However, with contacts 10 and 11 fixed the differential mechanism 22 will be operating almost continuously due to the ever present small load fluctuations which are taking place all the time in a system of any size. Furthermore, such an arrangement would not prevent relatively large swings in power flow through circuit 1 in response to relatively large changes in load because of the fact that it takes an appreciable amount of time for contacts 12 to move, as they move in accordance with the integrated effect of energy flow changes rather than in changes in the instantaneous value of the power flow.

When all the elements of the system are in operation, the elements under the control of the watt-responsive device 7 will preferably act quickly to check the small vibratory load fluctuations as well as the large swings in load, while the elements under the control of the differential mechanism 22 will preferably act relatively slowly to correct any integrated, or accumulated errors due to the operation of the means under the control of element 7, in such a manner as to keep the integrated deviations from the normal of the energy flow at a minimum value. My invention, however, is not limited to such a relation of the speed of operation of the various elements and it will be obvious to those skilled in the art that by choosing a suitable gear ratio for differential 22 the speed of operation of the integrating element may be small or great as desired.

It will be noted that when the value of power flow through circuit 1 increases above normal the contacts 10 and 12 both move toward each other, while if the load through circuit 1 decreases below the predetermined normal value, the contacts 12 and 11 both move toward each other. In this manner the indicating and integrating elements of my regulating arrangement both supplement each other and tend to increase the speed of operation of the regulating system as a whole. This action also tends to reduce hunting or overregulation of the system.

In order to provide positive anti-hunting for the regulator and also to provide improved operation of the contacts, I arrange to rotate the contacts 12 and 15 by means of a motor 29 which is connected to rotate these contacts by means of a suitable gear train 30. The motor 29 may be of any type and is illustrated as a conventional single-phase, split-phase induction disk type. Due to the fact that contact 12 is rotating, contacts 10 and 11 will engage it intermittently thereby producing an intermittent type of regulation which tends to prevent overrunning or hunting of the regulating system. Due to the resilience of contacts 10 and 11 they will tend to remain longer in engagement with the contact 12 as the contact pressure increases thereby tending to increase the speed of regulation as such speed is needed, that is to say, in accordance with increases in the departure from normal of the regulated quantity. Furthermore, the rotation of both contacts 12 and 15 produces a wiping action of the contacts which tends to keep the surfaces of the contacts clean and in good condition. These features of contact action are disclosed and claimed in the previously referred to Thompson patent.

When it is desired to change the setting of the regulator so as to cause it to hold different values of instantaneous and average power flow, resistance 27 is adjusted to a new value thereby changing the speed of motor element 21. This may be done with or without changing the restraining torque of the restraining spring of the wattmeter torque element 7. If the torque of the restraining spring is not adjusted concurrently with the ...tment of the resistance 27, the assembly 23 carrying the contacts 12 and 15 will take up a new normal position with the result that the contact carrying assembly 8 will also take up a corresponding normal position, whereas if the torque of the restraining spring is adjusted to correspond with the change in resistance of 27, the normal positions of the various elements will remain unchanged.

When it is desired to take the regulator out of service, it is preferable to provide some kind of a friction clutch between the differential and motor elements 20 or 21, so that the forces on the regulating arrangement which are produced by an accumulated error in the integrated value of the energy flow will not cause injury to the various parts. Thus, as this accumulated error increases, the friction clutch will merely slip and will relieve any undue strain on the parts. Similarly, it is also desirable to provide stops for the differential 22 so as to limit the motion of the parts controlled thereby and prevent injury thereto in case of failure of the regulating system to reduce any accumulated errors in the integrating value of the energy flow which might arise.

While I have shown and described a particular embodiment of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. A regulator having, in combination, a pair of cooperating contacts, means for moving one of said contacts in accordance with changes in the instantaneous value of a quantity to be regulated, and means for moving the other contact in accordance with changes in the integrated value of a quantity to be regulated.

2. A regulator having, in combination, a pair of cooperating contacts, means for moving one of said contacts toward the other in response to instantaneous deviations from a normal value of a condition to be regulated, and means for moving the other contact toward the first mentioned contact in response to integrated deviations from said normal value of said condition to be regulated.

3. A regulator having, in combination, a pair of cooperable contacts, means responsive to the instantaneous value of a condition to be regulated for moving one of said contacts, a device for producing rotary movement whose speed is proportional to the instantaneous value of said condition, a source of substantially constant speed rotation, and means for moving said other contact in accordance with a difference in speed between said device and said source.

4. In combination, an electric power circuit, means for controlling the power flow in said circuit, a pair of cooperating contacts for controlling the operation of said means, means responsive to the instantaneous value of the power flow in said circuit for moving one of said cooperating contacts toward the other when the instantaneous value of said power flow departs from a predetermined normal value, and means responsive to the integrated value of deviations from said predetermined normal value of the power flow in said circuit for moving the other contact toward the first mentioned contact.

5. A load regulator having, in combination, an electric power circuit, a pair of movable cooperating contacts for regulating the power flow in said circuit, a wattmeter torque element connected to said circuit and arranged to move one of said contacts, a watthour meter motor element connected to said circuit, a constant speed device, and a differential arrangement connected between said motor element and said device and arranged to move the other contact.

6. In combination, an electrical load, a power supply circuit connected thereto, an auxiliary source of power connected thereto, and means responsive to both the instantaneous value of the power flow in said circuit and to the integrated value of the energy flow in said circuit for controlling the power output of said auxiliary source in a manner to maintain the instantaneous value of the power flow in said circuit substantially constant while at the same time maintaining integrated deviations in power flow from said constant power flow at a minimum.

7. In combination, an electric power circuit, means for controlling the power flow through said circuit, and a load regulator for said circuit for operating on said control means, said regulator including means for making the integrated energy deviations from a normal value of power flow through said circuit a minimum.

8. In combination, an electric power circuit, means for controlling the power flow through said circuit, and a regulator for said circuit for operating on said power control means, said regulator including differential means for causing the energy flow through said circuit to be substantially exactly proportional to time.

9. In combination, an electric power circuit, means for varying the power flow through said circuit, and regulating means acting substantially continuously to maintain equality between the instantaneous value and the average value of power flow through said circuit.

10. In combination, a pair of interconnected electric power circuits, means tending to vary the power flow in said circuits, and an integrating type load regulator for maintaining equality between the instantaneous value and the average value of power flow in one of said circuits by varying the power flow in the other circuit.

11. An automatic integrating type electrical load regulator including, in combination, a plurality of contacts for making and breaking load control circuits, a differential mechanism for operating one of said contacts, and a pair of motor elements for operating said differential, one of said motor elements being a substantially constant speed device and the other of said motor elements being arranged to operate at a speed proportional to the power flow to be regulated.

12. An automatic electrical load regulating system including, in combination, an electric circuit whose load is to be regulated, a variable position device for controlling the power flow in said circuit, a motor for shifting said device to any operating position, a differential, means under the control of said differential for starting and stopping said motor, a pair of rotating elements for operating said differential, one of said rotating elements being a substantially constant speed device and the other of said rotating elements being arranged to operate at a speed proportional to the power flow in said circuit.

13. In combination, a circuit controlling means, two means for independently controlling the operation of said circuit controlling means, said two means being responsive respectively to a variable quantity and to an infinitesimal calculus function of said quantity.

14. In combination, circuit controlling means having an effective circuit closing condition and an effective circuit opening condition, two means for each independently acting to put said circuit controlling means in the same one of said conditions, said two means being responsive respectively to a variable quantity and to an infinitesimal calculus function of said quantity.

15. In combination, apparatus having a variable quantity to be regulated, electrically operated means for controlling said quantity, and two mechanisms for independently controlling the operation of said means, said mechanisms being responsive respectively to said quantity and to an integral function of said quantity.

16. In combination, circuit controlling means, two means for independently controlling the operation of said circuit controlling means, said two means being responsive respectively to a variable quantity and to an infinitesimal calculus function of said quantity with respect to time.

17. In combination, circuit controlling means having an effective circuit closing condition and an effective circuit opening condition, two means for each independently acting to put said circuit controlling means in the same one of said conditions, said two means being responsive respectively to a variable quantity and to an infinitesimal calculus function of said quantity with respect to time.

18. In combination, apparatus having a variable quantity to be regulated, electrically operated means for controlling said quantity, and two mechanisms for independently controlling the operation of said means, said mechanisms being responsive respectively to said quantity and to an integral function of said quantity with respect to time.

19. An electric circuit, a load regulator for said circuit including means for maintaining substantially zero any integrated energy deviations in watt-hours of the power flow through said circuit in watts from a predetermined normal value, and means responsive to deviations in power flow through said circuit in watts, from said normal value for accelerating the action of said first mentioned means.

20. An electric circuit, a load regulator for said circuit including means responsive to the power flow through said circuit in watts for maintaining said power flow substantially constant, and means responsive to any integrated energy deviations in watt hours of the power flow through said circuit from said normal value for causing said regulator also to maintain said deviations substantially zero.

ALAN G. DARLING.

DISCLAIMER 1,920,783.—*Alan G. Darling*, Schenectady, N. Y. ELECTRICAL REGULATOR. Patent dated August 1, 1933. Disclaimer filed March 10, 1934, by the assignee, *General Electric Company*.

Hereby enters the following disclaimer to claims 1, 2, 3, 13, 14, 15, 16, 17 and 18 of the said Letters Patent, which are in the following words, to wit:

"1. A regulator having, in combination, a pair of cooperating contacts, means for moving one of said contacts in accordance with changes in the instantaneous value of a quantity to be regulated, and means for moving the other contact in accordance with changes in the integrated value of a quantity to be regulated.

"2. A regulator having, in combination, a pair of cooperating contacts, means for moving one of said contacts toward the other in response to instantaneous deviations from a normal value of a condition to be regulated, and means for moving the other contact toward the first-mentioned contact in response to integrated deviations from said normal value of said condition to be regulated.

"3. A regulator having, in combination, a pair of cooperable contacts, means responsive to the instantaneous value of a condition to be regulated for moving one of said contacts, a device for producing rotary movement whose speed is proportional to the instantaneous value of said condition, a source of substantially constant speed rotation, and means for moving said other contact in accordance with a difference in speed between said device and said source."

"13. In combination, a circuit controlling means, two means for independently controlling the operation of said circuit controlling means, said two means being responsive respectively to a variable quantity and to an infinitesimal calculus function of said quantity.

"14. In combination, circuit controlling means having an effective circuit closing condition and an effective circuit opening condition, two means for each independently acting to put said circuit controlling means in the same one of said conditions, said two means being responsive respectively to a variable quantity and to an infinitesimal calculus function of said quantity.

"15. In combination, apparatus having a variable quantity to be regulated, electrically operated means for controlling said quantity, and two mechanisms for independently controlling the operation of said means, said mechanisms being responsive respectively to said quantity and to an integral function of said quantity.

"16. In combination, circuit controlling means, two means for independently controlling the operation of said circuit controlling means, said two means being responsive respectively to a variable quantity and to an infinitesimal calculus function of said quantity with respect to time.

"17. In combination, circuit controlling means having an effective circuit closing condition and an effective circuit opening condition, two means for each independently acting to put said circuit controlling means in the same one of said conditions, said two means being responsive respectively to a variable quantity and to an infinitesimal calculus function of said quantity with respect to time.

"18. In combination, apparatus having a variable quantity to be regulated, electrically operated means for controlling said quantity, and two mechanisms for independently controlling the operation of said means, said mechanisms being responsive respectively to said quantity and to an integral function of said quantity with respect to time."

[*Official Gazette April 3, 1934.*]